(12) United States Patent
Sato (10) Patent No.: US 10,312,723 B2
(45) Date of Patent: Jun. 4, 2019

(54) ELECTRONIC DEVICE AND METHOD OF CONTROLLING ELECTRONIC DEVICE

(71) Applicant: CANON KABUSHIKI KAISHA, Tokyo (JP)

(72) Inventor: Yasuhiro Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 217 days.

(21) Appl. No.: 15/280,578

(22) Filed: Sep. 29, 2016

(65) Prior Publication Data

US 2017/0104361 A1    Apr. 13, 2017

(30) Foreign Application Priority Data

Oct. 9, 2015 (JP) ................................ 2015-201586

(51) Int. Cl.
| | | |
|---|---|---|
| *H02J 7/00* | (2006.01) | |
| *H02J 7/04* | (2006.01) | |
| *G05B 15/02* | (2006.01) | |
| *G06F 1/26* | (2006.01) | |

(52) U.S. Cl.
CPC ............... *H02J 7/04* (2013.01); *G05B 15/02* (2013.01); *G06F 1/26* (2013.01); *H02J 7/007* (2013.01); *H02J 7/0036* (2013.01); *G05B 2219/2639* (2013.01); *H02J 2007/0001* (2013.01)

(58) Field of Classification Search
CPC .............................................. H02J 2007/0001
See application file for complete search history.

(56) References Cited

U.S. PATENT DOCUMENTS

| 5,414,260 A | 5/1995 | Takimoto et al. | |
|---|---|---|---|
| 2013/0113429 A1* | 5/2013 | Kim ...................... | H02J 7/0004 320/128 |
| 2015/0188346 A1 | 7/2015 | Oku | |
| 2016/0294206 A1* | 10/2016 | Okawa .................. | H02J 7/0004 |

FOREIGN PATENT DOCUMENTS

JP        2014-158412 A      8/2014

* cited by examiner

*Primary Examiner* — Fritz M Fleming
(74) *Attorney, Agent, or Firm* — Venable LLP (57) ABSTRACT

An electronic device comprises a power control unit that performs control to supply power supplied from an external apparatus to the electronic device to a first power path and a second power path, wherein the first power path differs from the second power path, and the second power path is a power path for supplying power supplied from the external apparatus to the electronic device to a battery, and an authentication unit that performs authentication to determine whether the battery is a predetermined battery. The power control unit limits supply of power supplied from the external apparatus to the electronic device to the first power path and the second power path when the authentication has failed.

16 Claims, 5 Drawing Sheets

ELECTRONIC DEVICE AND METHOD OF CONTROLLING ELECTRONIC DEVICE

BACKGROUND

Field of the Invention

Aspects of the present invention generally relate to an electronic device capable of charging a battery and a method of controlling the electronic device.

Description of the Related Art

An electronic device such as a digital camera operates on a detachable chargeable battery. Such an electronic device can charge a battery connected to the electronic device (Japanese Patent Laid-Open No. 2014-158412).

However, charging an unauthentic battery disguised as a genuine battery connected to an electronic device may reduce the safety of the battery in terms of charging.

SUMMARY

According to an aspect of the present invention, it is possible to charge a battery in consideration of the safety of an electronic device used to charge a battery with power supplied from an external apparatus.

According to an aspect of the present invention, the use of an electronic device which can charge a battery pack is facilitated.

According to an aspect of the present invention, an electronic device includes: a power control unit that performs control to supply power supplied from an external apparatus to the electronic device to a first power path and a second power path, wherein the first power path differs from the second power path, and the second power path is a power path for supplying power supplied from the external apparatus to the electronic device to a battery; and an authentication unit that performs authentication to determine whether the battery is a predetermined battery, wherein the power control unit limits supply of power supplied from the external apparatus to the electronic device to the first power path and the second power path when the authentication has failed.

According to an aspect of the present invention, a method includes: performing control to supply power supplied from an external apparatus to an electronic device to a first power path and a second power path, wherein the first power path differs from the second power path, and the second power path is a power path for supplying power supplied from the external apparatus to the electronic device to a battery; performing authentication to determine whether the battery is a predetermined battery; and limiting supply of power supplied from the external apparatus to the electronic device to the first power path and the second power path when the authentication has failed.

According to an aspect of the present invention, a non-transitory storage medium that stores a program causing a computer to execute a method, the method comprising: performing control to supply power supplied from an external apparatus to an electronic device to a first power path and a second power path, wherein the first power path differs from the second power path, and the second power path is a power path for supplying power supplied from the external apparatus to the electronic device to a battery; performing authentication to determine whether the battery is a predetermined battery; and limiting supply of power supplied from the external apparatus to the electronic device to the first power path and the second power path when the authentication has failed.

Further features and aspects of the present invention will become apparent from the following description of exemplary embodiments.

DESCRIPTION OF THE EMBODIMENTS

Exemplary embodiments, features, and aspects of the present invention will be described below with reference to the drawings. However, aspects of the present invention are not limited to the following embodiments.

Figure 1:
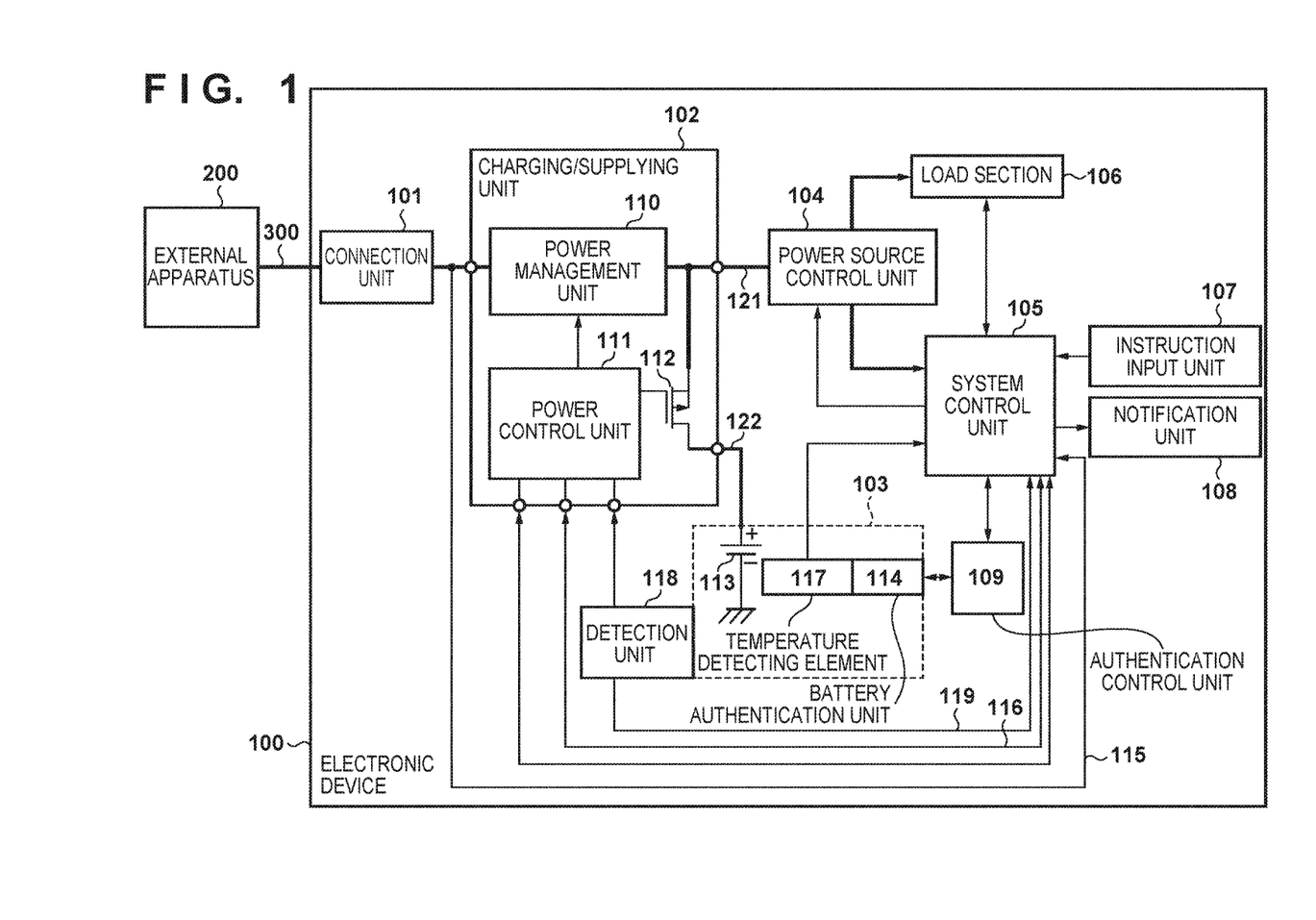
FIG. 1 is a block diagram illustrating an example of components of an electronic device 100 according to the first embodiment.

FIG. 1 is a block diagram illustrating an example of components of an electronic device 100 according to the first embodiment. For example, the electronic device 100 is an image capture apparatus which can act as a digital camera. Note however that the electronic device 100 is not limited to an image capture apparatus and may be a portable device acting as a mobile phone.

As shown in FIG. 1, the electronic device 100 includes a connection unit 101, a charging/supplying unit 102, a battery 103, a power source control unit 104, a system control unit 105, a load section 106, an instruction input unit 107, a notification unit 108, an authentication control unit 109, and a detection unit 118.

An external apparatus 200 is an external electronic device which can supply power to the electronic device 100. The external apparatus 200 can convert a voltage from a commercial power source into a power source voltage which can be used by the electronic device 100 and supply the voltage to the electronic device 100. As the external apparatus 200, for example, an AC adapter (charger) or PC (personal computer) is available. A connection medium 300 connects the connection unit 101 of the electronic device 100 to the external apparatus 200. As the connection medium 300, for example, a line such as a USB (Universal Serial Bus) cable is available when wired power supply is used. Alternatively, when wireless power transmission typified by the Qi specifications is used, the connection medium 300 is a path in the air through which electromagnetic waves for power supply pass.

The connection unit 101 is an interface unit which is connected to the external apparatus 200 via the connection medium 300 and has a function (power reception function) of receiving power supplied from the external apparatus 200. Note that the connection unit 101 may have an information transmission/reception function in addition to the power reception function. The connection unit 101 has, for example, a USB (Universal Serial Bus) interface unit. Note that the connection unit 101 may have an interface unit which performs wireless power transmission. In addition, the connection unit 101 may have an interface unit which performs wireless power transmission specified by, for example, the Qi specifications.

The charging/supplying unit 102 includes a power management unit 110, a power control unit 111, and a switch element 112, and can be formed from, for example, a semiconductor integrated circuit. For example, the switch element 112 is formed inside the semiconductor integrated circuit, and is formed from a MOSFET or the like. The switch element 112 is controlled by the power control unit 111 to, for example, connect and cut off a path for charging the battery 103 and discharging for the operation of the electronic device 100 from the battery 103.

The power management unit 110 and the power control unit 111 cooperatively control the supply of power supplied from the external apparatus 200 to the electronic device 100. Controlled power is output to a first power path 121 connected to the power source control unit 104 to be supplied to each component of the electronic device 100. The controlled power is further output, via the switch element 112, to a second power path 122 connected to the battery 103 to be used to charge the battery 103. In the first embodiment, the second power path 122 branches off from the first power path 121. The second power path 122 and the first power path 121 are connected to each other via the switch element 112. The power management unit 110 includes a current limiting circuit and a voltage conversion circuit typified by a linear regular or DC/DC converter. The power management unit 110 is controlled by the power control unit 111 to limit power supplied from the external apparatus 200 and perform voltage conversion and power conversion with respect to received power. For example, when receiving power supplied from the external apparatus 200 based on specifications defining an upper limit on power which can be supplied, like a USB (Universal Serial Bus) interface unit, the power management unit 110 performs current limitation in accordance with an instruction from the power control unit 111 so as not to make a current supplied from the external apparatus 200 exceed the upper limit.

When the load current of the electronic device 100 exceeds power supplied from the external apparatus 200, the power control unit 111 decreases the output voltage of the power management unit 110 to the voltage of the battery 103 and sets the switch element 112 in the ON state (connected state). This makes it possible to use both power supplied from the external apparatus 200 and power supplied from the battery 103, thereby a load current shortage is compensated by power supplied from the battery 103. Assume that the external apparatus 200 can supply a current of 500 mA from a Universal Serial Bus (USB) to a PC (personal computer), and the consumed current (sink current) of the electronic device 100 exceeds 500 mA. In this case, the electronic device 100 uses both power supplied from the external apparatus 200 and power supplied from the battery 103.

When the load current of the electronic device 100 becomes equal to or less than power supplied from the external apparatus 200, the power control unit 111 stops the combined use of power supplied from the external apparatus 200 and power supplied from the battery 103, and operates on power supplied from the external apparatus 200. At this time, the switch element 112 may be turned on to simultaneously charge the battery 103. When charging the battery 103 with power supplied from the external apparatus 200, the power control unit 111 causes the power management unit 110 to output an output voltage higher than that of the battery 103 and control a current to charge the battery 103 by adjusting the switch element 112. If, for example, the terminal voltage of the battery 103 is 3.7 V and the output voltage of the power management unit 110 is 4.5 V, the power control unit 111 controls a current to charge by adjusting the switch element 112, thereby charging the battery 103.

If there is no power supply from the external apparatus 200, the power control unit 111 performs control to turn on the switch element 112 to supply power from the battery 103 to the system control unit 105 via the switch element 112. In addition, the power control unit 111 can perform suspend control of the power management unit 110 in accordance with a suspend control signal 116 from the system control unit 105. This allows the power control unit 111 to supply power supplied from the external apparatus 200 to the system control unit 105 and impose limitations (including stopping) on power supply to the battery 103 for charging.

Figure 2:
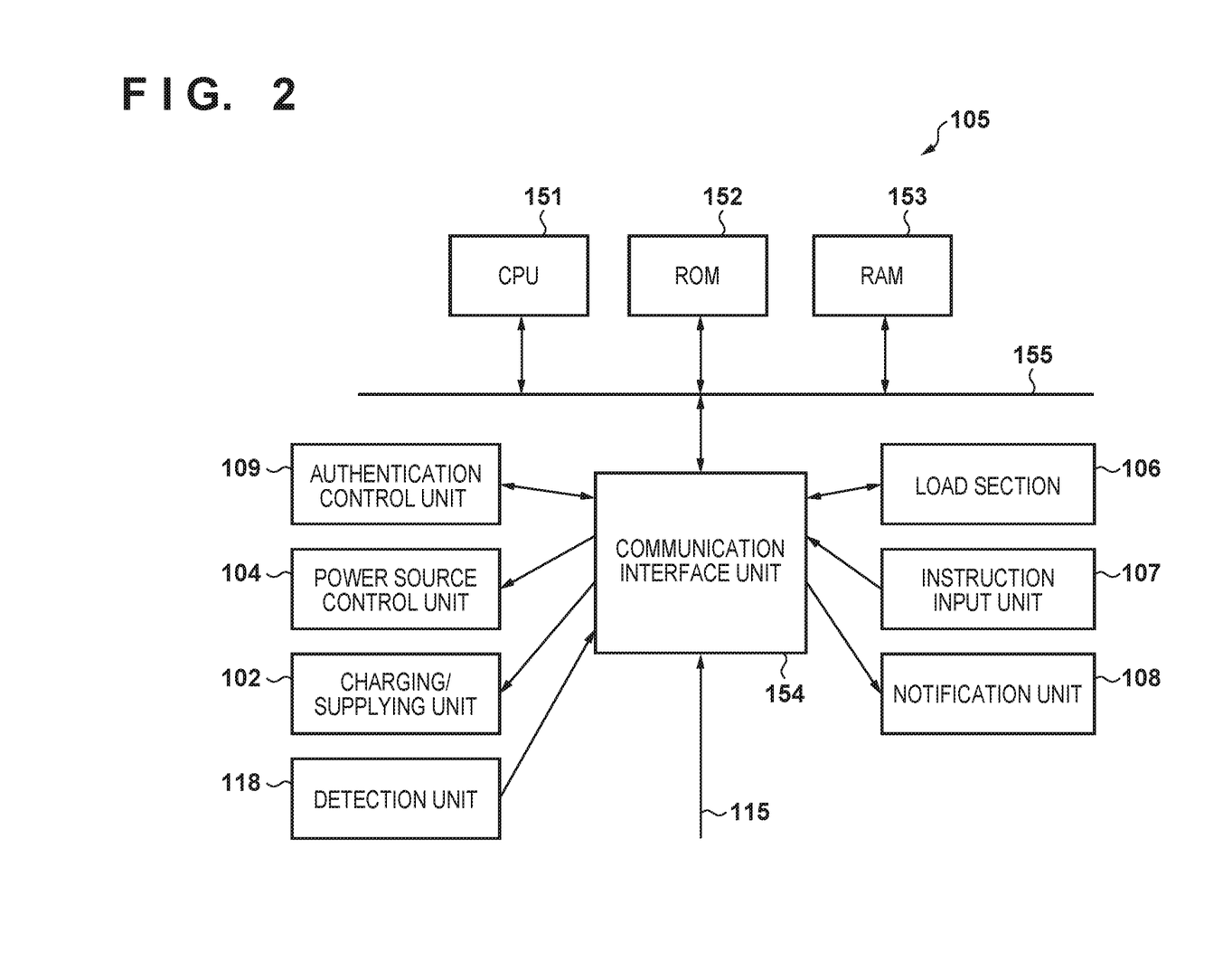
FIG. 2 is a block diagram illustrating an example of components of a system control unit 105.

The system control unit 105 can control each component of the electronic device 100. FIG. 2 is a block diagram illustrating and example of components of the system control unit 105. As shown in FIG. 2, the system control unit 105 includes a CPU 151 (central processing unit), a ROM 152 (read only memory), a RAM 153 (random access memory), and a communication interface unit 154. Note that the ROM 152 and the RAM 153 exemplify memory arrangements, but this is not exhaustive. The CPU 151 implements various types of operations including processes to be described with reference to the flowcharts of FIGS. 3A, 3B and 4 by executing programs stored in the ROM 152 or the RAM 153. The ROM 152 stores various types of data and various types of programs executed by the CPU 151. A program read out from the ROM 152 in accordance with a process to be executed is loaded into the CPU 151. In addition, various types of data generated in the course of processes executed by the CPU 151 are temporarily stored in the RAM 153. Control targets such as the charging/supplying unit 102, the load section 106 (to be described later), and the power source control unit 104 are connected to the communication interface unit 154 to implement communication between the control targets and the CPU 151. The CPU 151, the ROM 152, the RAM 153, and the communication interface unit 154 are connected to a bus 155 and can communicate with each other.

Referring to FIG. 1, the system control unit 105 can detect the presence/absence of power supplied from the external apparatus 200 in accordance with a detection signal 115 concerning externally supplied power. For example, upon reception of externally supplied power via the USB, the system control unit 105 can detect that a voltage is applied to a power line (VBUS) of the USB. In addition, the system control unit 105 limits power supply from the external apparatus 200 by outputting the suspend control signal 116 to the charging/supplying unit 102. In the first embodiment, when the suspend control signal 116 is at logic High, the power management unit 110 limits power supply from the external apparatus 200. When the suspend control signal 116 is at logic Low, the power management unit 110 performs power supply from the external apparatus 200 to supply power to the power source control unit 104 and/or charge the battery 103. Assuming that power supply is performed from the external apparatus 200 via the USB, the power management unit 110 limits power supply to output a current equal to or less than 2.5 mA, when the suspend control signal 116 is at logic High. This state will be referred to as an inhibited state hereinafter. Note that in the inhibited state when the suspend control signal 116 is at logic High, power supply may be completely cut off. In addition, when the suspend control signal 116 is at logic Low, if, USB (Universal Serial Bus) 2.0 is used, the power management unit 110 starts power supply with an upper limit being 500 mA. This state will be referred to as a power supply state hereinafter.

The battery 103 is a chargeable battery such as a lithium ion battery, and is detachable from the electronic device 100. The battery 103 includes a chargeable battery cell 113 for supplying power to the electronic device 100, a battery authentication unit 114 which performs authentication communication with the electronic device 100, and a temperature detecting element 117 which externally detects the temperature of the battery 103. The temperature detecting element 117 is, for example, a thermistor. The detection unit 118 detects whether the battery 103 is connected to the electronic device 100. The system control unit 105 or the charging/supplying unit 102 detects, in accordance with a detection signal 119 from the detection unit 118, whether the battery 103 is in the connected state. The detection unit 118 is, for example, a physical switch which is pressed when the battery 103 is connected. Note that the detection unit 118 is required to detect whether the battery 103 is connected. The detection unit 118 may be implemented by an arrangement other than a physical switch, such as an arrangement configured to detect a voltage obtained from an output terminal of the battery 103, an arrangement configured to detect the presence/absence of connection to the temperature detecting element 117 (a voltage obtained from a terminal of the temperature detecting element 117), or a combination of arrangements.

The power source control unit 104 is a power source unit capable of supplying power required by the system control unit 105 and the load section 106, and supplies power to the load section 106 and the system control unit 105 based on an instruction from the system control unit 105 or the instruction input unit 107. For example, the power source control unit 104 is constituted by a DC/DC converter, a linear regulator, and the like. The power source control unit 104 converts power supplied from the charging/supplying unit 102 into a voltage required by the system control unit 105 or the load section 106, and then supplies the voltage.

The load section 106 is a block which is in charge of functions of the electronic device 100, for example, receiving power supplied from the power source control unit 104 of the electronic device 100 and operating based on an instruction from the system control unit 105. For example, when the electronic device 100 has a wireless communication function, a circuit for implementing the wireless communication function corresponds to the load section 106. When the electronic device 100 has a camera function capable of capturing still images and moving images, a camera module or lens driving unit corresponds to the load section 106.

The instruction input unit 107 receives an instruction from the user and supplies the instruction signal to the system control unit 105. The instruction input unit 107 includes a switch member such as a power switch for powering on/off the electronic device. The notification unit 108 is configured to notify the user of, for example, the state of the electronic device 100. The notification unit 108 includes, for example, a light-emitting element or display device for visual notification and a speaker for auditory notification.

The authentication control unit 109 authenticates the battery 103 by performing authentication communication with the battery authentication unit 114 in the battery 103. Based on an instruction from the system control unit 105, the authentication control unit 109 performs authentication communication with the battery authentication unit 114, and notifies the system control unit 105 of the authentication communication result (authentication result) after the completion of the authentication communication. The system control unit 105 switches control based on the authentication result. The system control unit 105 outputs the logic-Low suspend control signal 116 to the power control unit 111 to permit charging of the battery 103 if the battery 103 is a genuine battery which can be authenticated. In contrast, the system control unit 105 outputs the logic-High suspend control signal 116 to the power control unit 111 to perform limitation so as to stop power supply from the external apparatus 200 and charging of the battery 103 if the battery 103 is an unauthentic battery pack battery which cannot be authenticated.

When the unauthentic battery 103 is detached from the electronic device 100 while limitations are imposed on power supply from the external apparatus 200 and charging of the battery 103, power supply from the external apparatus 200 is resumed. For example, the system control unit 105 detects the detachment of the battery 103 in accordance with the detection signal 119 from the detection unit 118 and sets a suspend control signal to the charging/supplying unit 102 at logic Low to remove the limited state of power supply from the external apparatus 200. This resumes power supply from the external apparatus 200 to the electronic device 100 in accordance with the detachment of the battery 103. Even if power supply from the battery 103 is lost, therefore, the electronic device 100 can continuously operate on power from the external apparatus 200. If the battery 103 is connected to the electronic device 100 afterward, the authentication control unit 109 performs authentication communication with the battery authentication unit 114 based on an instruction from the system control unit 105 and performs the same control as that described above in accordance with the authentication result.

Figure 3A:
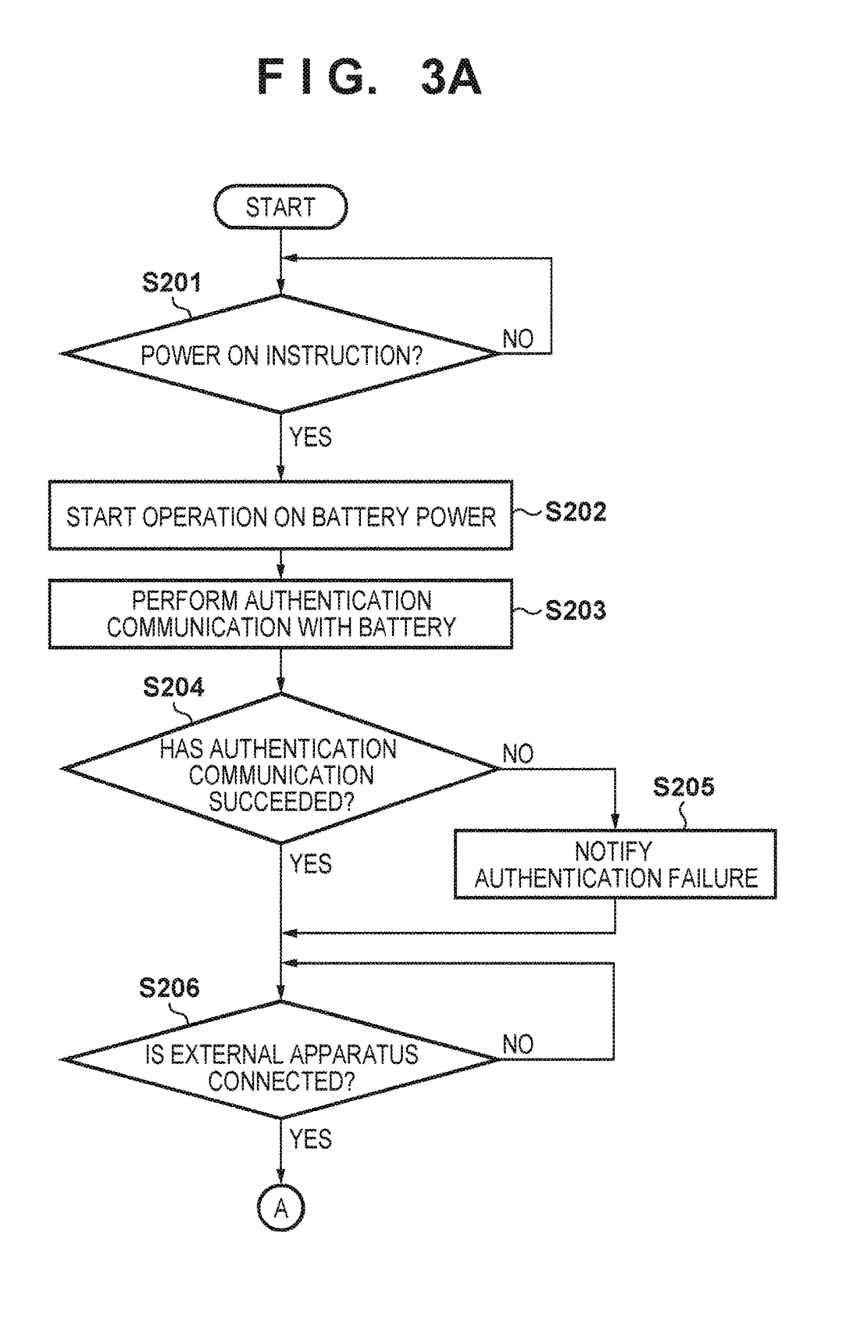
FIG. 3A and FIG. 3B are flowcharts illustrating an example of a first power supply control process according to the first embodiment.
Figure 3B:
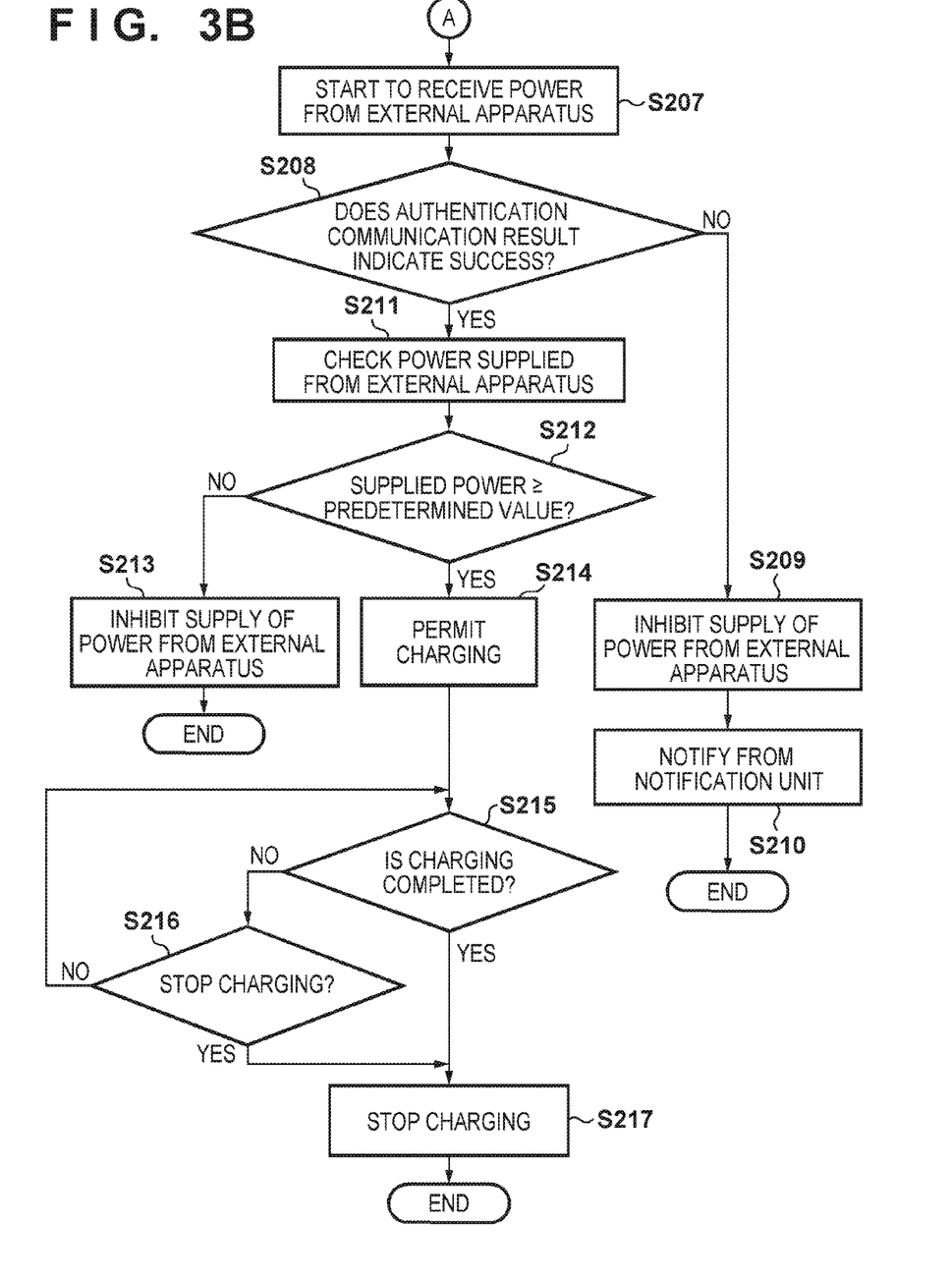

FIG. 3A and FIG. 3B are flowcharts illustrating an example of a first power supply control process according to the first embodiment. Assume that at the start of this flowchart, the electronic device 100 is not connected to the external apparatus 200 and is set in the power OFF state.

In step S201, upon reception of a power ON instruction from the user via the instruction input unit 107, the system control unit 105 advances to step S202.

In step S202, each component of the electronic device 100 starts operating on power supplied from the battery 103 in step S202. In the first embodiment, the switch element 112 operates to supply power supplied from the battery 103 to the power source control unit 104. The power source control unit 104 supplies power supplied from the battery 103 to the system control unit 105 and the load section 106.

In step S203, based on an instruction from the system control unit 105, the authentication control unit 109 performs authentication communication (authentication process) with the battery authentication unit 114 of the battery 103. When the electronic device 100 is activated in this manner, the authentication control unit 109 executes authentication of the battery 103 by using power supplied from the connected battery 103. Upon completion of the authentication communication, the system control unit 105 temporarily stores the authentication result. The authentication result is stored in, for example, the RAM 153.

In step S204, the system control unit 105 determines whether the authentication by the authentication communication with the battery 103 has succeeded.

If the authentication by the authentication communication has failed (NO in step S203), the system control unit 105 advances to step S205. In step S205, the system control unit 105 notifies the user of the authentication failure via the notification unit 108. Note that the notification unit 108 is required to notify the user of the authentication failure, and may notify the authentication failure by, for example, switching from the OFF state to the ON state of an LED (light emitting diode).

If the authentication by the authentication communication has succeeded (YES in step S203), the system control unit 105 advances to step S206. In step S206, the system control unit 105 monitors the detection signal 115 concerning external supply power to detect whether power is received from the external apparatus 200 connected to the electronic device 100. For example, the system control unit 105 monitors the detection signal 115 concerning external power supply periodically in a cycle having no influence on other operations of the electronic device 100, for example, in a cycle of 1 sec. Alternatively, the system control unit 105 may detect connection to the external apparatus 200 by handling the detection signal 115 concerning external power supply as an interruption signal to the CPU 151.

When the connection between the electronic device 100 and the external apparatus 200 is detected (YES in step S206), the system control unit 105 advances to step S207. In step S207, the system control unit 105 controls the charging/supplying unit 102 to use power supplied from the external apparatus 200 for the operation of the electronic device 100. For example, the system control unit 105 instructs the power control unit 111 of the charging/supplying unit 102 to set a power supply state, thereby starting power supply from the external apparatus 200 to the power source control unit 104. In this case, the switch element 112 is turned off to inhibit power for charging from being supplied to the battery 103. Note that when the electronic device 100 is connected to the external apparatus 200, power supplied from the external apparatus 200 may be used for the operation of the electronic device 100, or both power supplied from the external apparatus 200 and power supplied from the battery 103 may be used for the operation of the electronic device 100.

In step S208, the system control unit 105 refers to the authentication result stored in the RAM 153 in step S203 to determine whether the authentication result on the connected battery 103 indicates a success or failure.

If the system control unit 105 determines that the authentication result indicates a failure (NO in step S208), the system control unit 105 advances to step S209. In step S209, the system control unit 105 sets the suspend control signal 116 at logic High. This inhibits power supply from the power management unit 110 to the power source control unit 104, and thus the charging/supplying unit 102 is set in the inhibited state.

In step S210, the system control unit 105 notifies via the notification unit 108 that power supply and charging from the external apparatus 200 is in the inhibited state. In addition, at this time, the system control unit 105 issues an instruction to the charging/supplying unit 102 to make the electronic device 100 operate on power supplied from the battery 103. In accordance with this instruction, the charging/supplying unit 102 turns on the switch element 112 to supply power from the battery 103 to the power source control unit 104. Power that can be supplied from the battery 103 depends on the remaining charge of the battery 103. If, therefore, the remaining charge of the battery 103 is small, the system control unit 105 may perform power OFF control so as to set the electronic device 100 in the power OFF state after a lapse of a predetermined time since notification.

If the system control unit 105 determines that the authentication result indicates a success (YES in step S208), the system control unit 105 advances to step S211. In step S211, the system control unit 105 detects the power supply capability of the connected external apparatus 200, and determines whether it is possible to obtain power sufficient for the operation of the electronic device 100 or charging of the battery 103. In order to determine whether sufficient power is obtained from the external apparatus 200, if, for example, USB power supply is performed and the external apparatus 200 connected to the electronic device 100 is a PC, the system control unit 105 executes enumeration complying with the Universal Serial Bus (USB) specifications. With this operation, the system control unit 105 can know whether required power, for example, 5 V and 500 mA, can be supplied from the external apparatus 200.

If the system control unit 105 determines that the external apparatus 200 connected to the electronic device 100 has a supply capability equal to or more than a predetermined value (YES in step S212), the electronic device 100 can obtain required power from the external apparatus 200. Therefore, in step S214, the system control unit 105 permits charging of the battery 103 and starts to charge it. For example, the system control unit 105 causes the power management unit 110 to output a voltage higher than the terminal voltage of the battery cell 113 and turns on the switch element 112. In this manner, the electronic device 100 uses power obtained from the external apparatus 200 as power for charging the battery 103 while using it as power for the operation of the device.

If the system control unit 105 determines that the external apparatus 200 does not have a supply capability equal to or more than the predetermined value (NO in step S212), the electronic device 100 cannot obtain required power from the external apparatus 200. Therefore, in step S213, the system control unit 105 sets the charging/supplying unit 102 in the inhibited state so that power supply from the external apparatus 200 is inhibited. In this case, turning on the switch element 112 allows the electronic device 100 to operate on power supplied from the battery 103.

In steps S215 and S216, the system control unit 105 continues charging the battery 103 until a charge completion condition for the battery 103 is satisfied or an instruction to stop charging is detected. Note that the instruction to stop charging is given from the user via the instruction input unit 107 or is issued when the battery 103 is detached from the electronic device 100. When the charge completion condition is satisfied (YES in step S215) or the instruction to stop charging is detected (YES in step S216), the system control unit 105 advances to step S217.

In step S217, the system control unit 105 stops charging the battery 103. For example, the system control unit 105 instructs the charging/supplying unit 102 to turn off the switch element 112 and stop supplying power from the external apparatus 200 to the battery 103.

Note that after a process in step S217, the electronic device 100 may continue to operate on power supplied from the external apparatus 200 or may be set in the power OFF state if there is no need to operate.

In addition, when the battery 103 is detached from the electronic device 100 after a process in step S209, the system control unit 105 may shift the charging/supplying unit 102 from the inhibited state to the power supply state so as to allow the electronic device 100 to operate on power supplied from the external apparatus 200.

Figure 4:
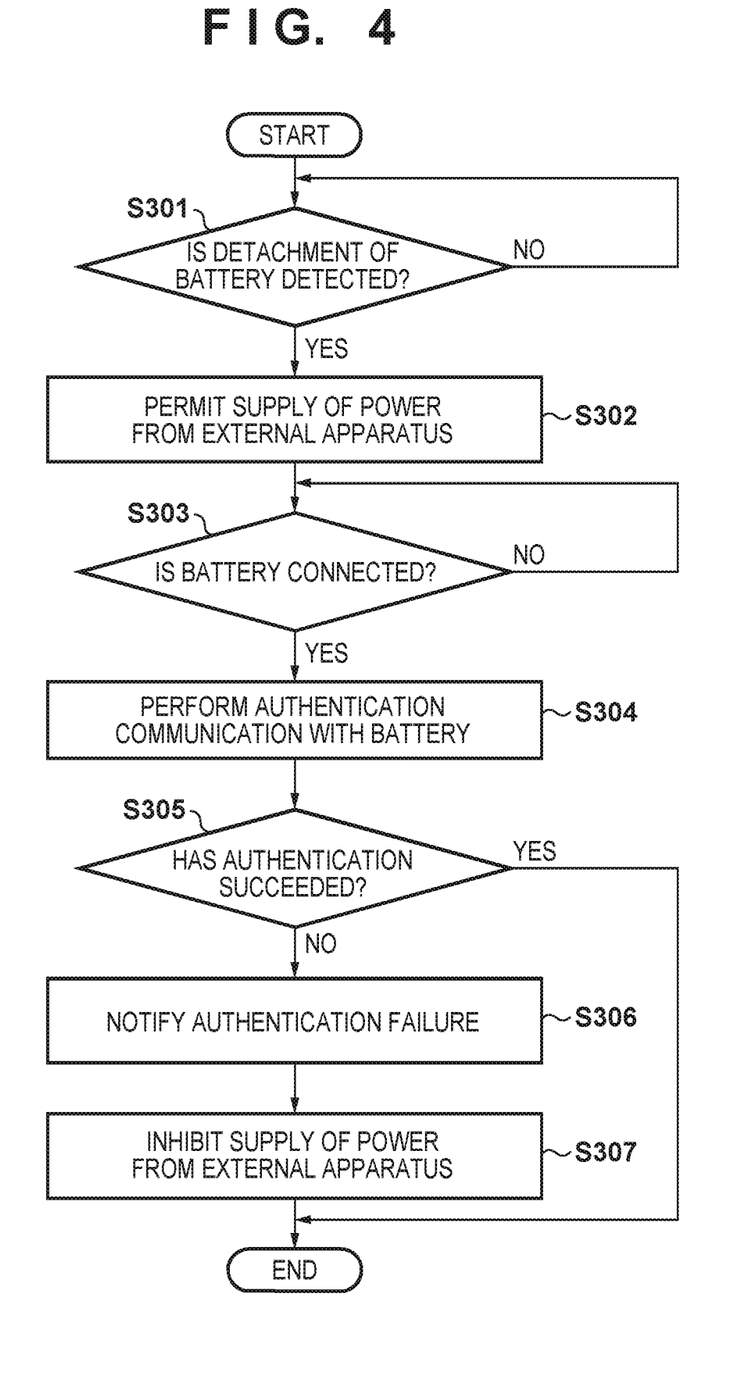
FIG. 4 is a flowchart illustrating an example of a second power supply control process according to the first embodiment.

FIG. 4 is a flowchart illustrating an example of a second power supply control process activated when the battery 103 is detached after the charging/supplying unit 102 is set in the inhibited state in step S209.

In step S301, the system control unit 105 detects, using the detection signal 119 from the detection unit 118, whether the battery 103 is detached. When the detachment of the battery 103 is detected (YES in step S301), the system control unit 105 advances to step S302.

In step S302, the system control unit 105 starts a process to be performed when the battery 103 is detached. Note that an arrangement for detecting the detachment of the battery 103 is not limited to the arrangement using the detection unit 118 as described above, and the detachment of the battery 103 may be detected based on the detection of an output voltage from the battery 103 or an output voltage from the temperature detecting element 117. In step S302, the system control unit 105 permits power supply from the external apparatus 200 (the charging/supplying unit 102 is shifted from the inhibited state to the power supply state).

Subsequently, in step S303, the system control unit 105 determines, using the detection signal 119 from the detection unit 118, whether the battery 103 is connected.

If the system control unit 105 determines that the battery 103 is connected (YES in step S303), the system control unit 105 advances to step S304. In step S304, the authentication control unit 109 performs authentication communication (authentication process) with the battery authentication unit 114 of the battery 103 based on an instruction from the system control unit 105. When the authentication communication is completed, the system control unit 105 temporarily stores the authentication result. The authentication result is stored in, for example, the RAM 153.

If the authentication by the authentication communication has failed (NO in step S305), the system control unit 105 advances to step S306. In step S306, the system control unit 105 notifies the user of the authentication failure via the notification unit 108 in step S306.

In step S307, the system control unit 105 sets the charging/supplying unit 102 in the inhibited state so that power supply from the external apparatus 200 is inhibited. The process in step S307 is the same as that in step S209.

If the authentication by the authentication communication has succeeded (YES in step S305), the system control unit 105 terminates the second power supply control process, and maintains power supply from the external apparatus 200 which has started in step S302. If the connection of the battery 103 is detected after the detection of a disconnected state of the battery 103, limitation on the first power path 121 is kept removed until an authentication result on the battery 103 obtained by the authentication control unit 109 becomes clear.

As described above, according to the first embodiment, it is possible to reduce the possibility of abnormal charging when the electronic device 100 operates on both power supplied from the external apparatus 200 and power supplied from the battery 103 and the battery 103 connected to the electronic device 100 is not suitable for charging. This makes it possible to charge the battery 103 while considering the safety of the electronic device 100 which uses power supplied from the external apparatus 200 to charge the battery 103.

Second Embodiment

Various functions, processes, and methods described in the first embodiment can be implemented by a personal computer, microcomputer, CPU (central processing unit), or the like using programs. In the second embodiment, a personal computer, microcomputer, CPU (central processing unit), or the like will be referred to as "computer X". In addition, in the second embodiment, programs which are used to control the computer X and implement various functions, processes, and methods described in the first embodiment will be referred to as "programs Y".

The computer X implements various functions, processes, and methods described in the first embodiment by executing the programs Y. In this case, the programs Y are supplied to the computer X via a computer-readable storage medium. The computer-readable storage medium according to the second embodiment includes at least one of a hard disk drive, magnetic storage device, optical storage device, magneto optical storage device, memory card, volatile memory, nonvolatile memory, and the like. The computer-readable storage medium according to the second embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all modifications and equivalent structures.

This application claims priority from Japanese Patent Application No. 2015-201586, filed Oct. 9, 2015, which is hereby incorporated by reference herein in its entirety.

What is claimed is:

1. An electronic device comprising:
an authentication unit that performs authentication to determine whether a battery is a predetermined battery;
a power receiving unit that receives power supplied from an external apparatus; and
a power control unit that (a) controls power supplied from the external apparatus to a first power path and a second power path if it has been determined that the battery is the predetermined battery, and (b) limits power supplied from the external apparatus to the first power path and the second power path if it has been determined that the battery is not the predetermined battery,
wherein the first power path differs from the second power path, and the second power path is a power path for supplying power from the power control unit to the battery.

2. The electronic device according to claim 1, wherein the second power path is provided so as to branch off from the first power path, and
wherein the power control unit limits power supplied from the external apparatus to the second power path by limiting power supplied from the external apparatus to the first power path.

3. The electronic device according to claim 1, wherein the second power path is connected to the first power path via a switching unit.

4. The electronic device according to claim 1, wherein when the electronic device is activated, the authentication unit performs the authentication by using power supplied from the battery.

5. The electronic device according to claim 1, wherein the first power path is a power path for supplying power supplied from the power receiving unit to a component of the electronic device, and
wherein the component of the electronic device differs from the battery.

6. The electronic device according to claim 1, wherein the power control unit limits power supplied from the external apparatus to the second power path by limiting power supplied from the external apparatus to the first power path if it has been determined that the battery is not the predetermined battery.

7. A method comprising:
performing authentication to determine whether a battery is a predetermined battery;
causing a power receiving unit to receive power supplied from an external apparatus;
controlling power supplied from the external apparatus to a first power path and a second power path if it has been determined that the battery is the predetermined battery; and
limiting power supplied from the external apparatus to the first power path and the second power path if it has been determined that the battery is not the predetermined battery,
wherein the first power path differs from the second power path, and the second power path is a power path for supplying power from the power control unit to the battery.

8. A non-transitory storage medium that stores a program causing a computer to execute a method, the method comprising:
performing authentication to determine whether a battery is a predetermined battery;
causing a power receiving unit to receive power supplied from an external apparatus;
controlling power supplied from the external apparatus to a first power path and a second power path if it has been determined that the battery is the predetermined battery; and
limiting power supplied from the external apparatus to the first power path and the second power path if it has been determined that the battery is not the predetermined battery,
wherein the first power path differs from the second power path, and the second power path is a power path from supplying power from the power control unit to the battery.

9. An electronic device comprising:
an authentication unit that performs authentication to determine whether a battery is a predetermined battery;
a power receiving unit that receives power supplied from an external apparatus; and
a power control unit that (a) controls power supplied from the external apparatus to a first power path and a second power path if it has been determined that the battery is the predetermined battery, and (b) limits power supplied from the external apparatus to the second power path if it has been determined that the battery is not the predetermined battery,
wherein the first power path differs from the second power path, and the second power path is a power path for supplying power from the power control unit to the battery.

10. The electronic device according to claim 9, wherein the second power path is provided so as to branch off from the first power path, and
wherein the power control unit limits power supplied from the external apparatus to the second power path by limiting power supplied from the external apparatus to the first power path.

11. The electronic device according to claim 9, wherein the second power path is connected to the first power path via a switching unit.

12. The electronic device according to claim 9, wherein, when the electronic device is activated, the authentication unit performs the authentication by using power supplied from the battery.

13. The electronic device according to claim 9, wherein the first power path is a power path for supplying power supplied from the power receiving unit to a component of the electronic device, and
wherein the component of the electronic device differs from the battery.

14. The electronic device according to claim 9, wherein the power control unit limits power supplied from the external apparatus to the second power path by limiting power supplied from the external apparatus to the first power path if it has been determined that the battery is not the predetermined battery.

15. A method comprising:
performing authentication to determine whether a battery is a predetermined battery;
causing a power receiving unit to receive power supplied from an external apparatus;
controlling power supplied from the external apparatus to a first power path and a second power path if it has been determined that the battery is the predetermined battery; and
limiting power supplied from the external apparatus to the second power path if it has been determined that the battery is not the predetermined battery,
wherein the first power path differs from the second power path, and the second power path is a power path for supplying power from the power control unit to the battery.

16. A non-transitory storage medium that stores a program causing a computer to execute a method, the method comprising:
performing authentication to determine whether a battery is a predetermined battery;
causing a power receiving unit to receive power supplied from an external apparatus;
controlling power supplied from the external apparatus to a first power path and a second power path if it has been determined that the battery is the predetermined battery; and
limiting power supplied from the external apparatus to the second power path if it has been determined that the battery is not the predetermined battery,
wherein the first power path differs from the second power path, and the second power path is a power path for supplying power from the power control unit to the battery.

* * * * *